United States Patent [19]
Smith

[11] Patent Number: 5,505,346
[45] Date of Patent: Apr. 9, 1996

[54] THUMB ACTUATED FLEXIBLE TUBE AND CLOSURE SYSTEM

[75] Inventor: Roger P. Smith, Napoleon, Ohio

[73] Assignee: Owens-Illinois Plastic Products Inc., Toledo, Ohio

[21] Appl. No.: 371,905

[22] Filed: Jan. 12, 1995

Related U.S. Application Data

[63] Continuation-in-part of Ser. No. 228,048, Apr. 15, 1994.
[51] Int. Cl.$^6$ ........................................................ B67D 3/00
[52] U.S. Cl. ............................................. 222/505; 222/521
[58] Field of Search ....................................... 222/505, 507, 222/519, 520, 521, 105, 107, 212

[56] References Cited

U.S. PATENT DOCUMENTS

| | | | |
|---|---|---|---|
| 850,086 | 4/1907 | Goss | 222/520 |
| 1,543,097 | 6/1925 | Canton . | |
| 1,620,316 | 3/1927 | Baltzley . | |
| 2,171,700 | 9/1939 | Hobson et al. | 222/520 |
| 2,202,852 | 6/1940 | Hansen | 222/519 |
| 3,010,619 | 11/1961 | Gronemeyer et al. . | |
| 3,194,453 | 7/1965 | Cherba | 222/521 |
| 3,549,060 | 12/1970 | Smylie . | |
| 4,383,623 | 5/1983 | Page, III | 222/521 |
| 4,964,548 | 10/1990 | Kenyon . | |
| 5,186,369 | 2/1993 | Aguirrezabal | 222/521 |
| 5,199,605 | 4/1993 | Schneider | 222/521 |

FOREIGN PATENT DOCUMENTS

1399492  7/1975  United Kingdom ................... 222/521

*Primary Examiner*—Andres Kashnikow
*Assistant Examiner*—Kenneth Bomberg

[57] ABSTRACT

A thumb actuated flexible tube and closure system comprising a flexible plastic tube having a finish for dispensing a product when the tube is in an inverted position. The finish has an integral transverse wall, an integral post extending upwardly from the transverse wall and an integral cylindrical wall extending upwardly from said transverse wall. The transverse wall has at least one opening therethrough. An inner closure is provided and has a base wall and integral spaced inner and outer walls defining an annular space for receiving the finish of the plastic tube. At least one of the walls has threads thereon for rotatably engaging the finish. The base wall of the inner closure has a portion sealingly engaging the post on the finish such that rotation of the inner closure moves said sealing portion into and out of engagement with said post. An overcap closure is provided and has a base wall with an opening aligned with the sealing portion of said closure. The overcap and finish have interengaging elements to hold the overcap against rotational movement. The overcap includes a peripheral wall having an opening therein. A finger engaging portion on the inner closure extends through the opening in the overcap closure adapted to be engaged by a thumb of the user as the plastic tube is held in inverted position to rotate the inner closure and move the inner closure into and out of sealing position with the post on the finish.

13 Claims, 5 Drawing Sheets

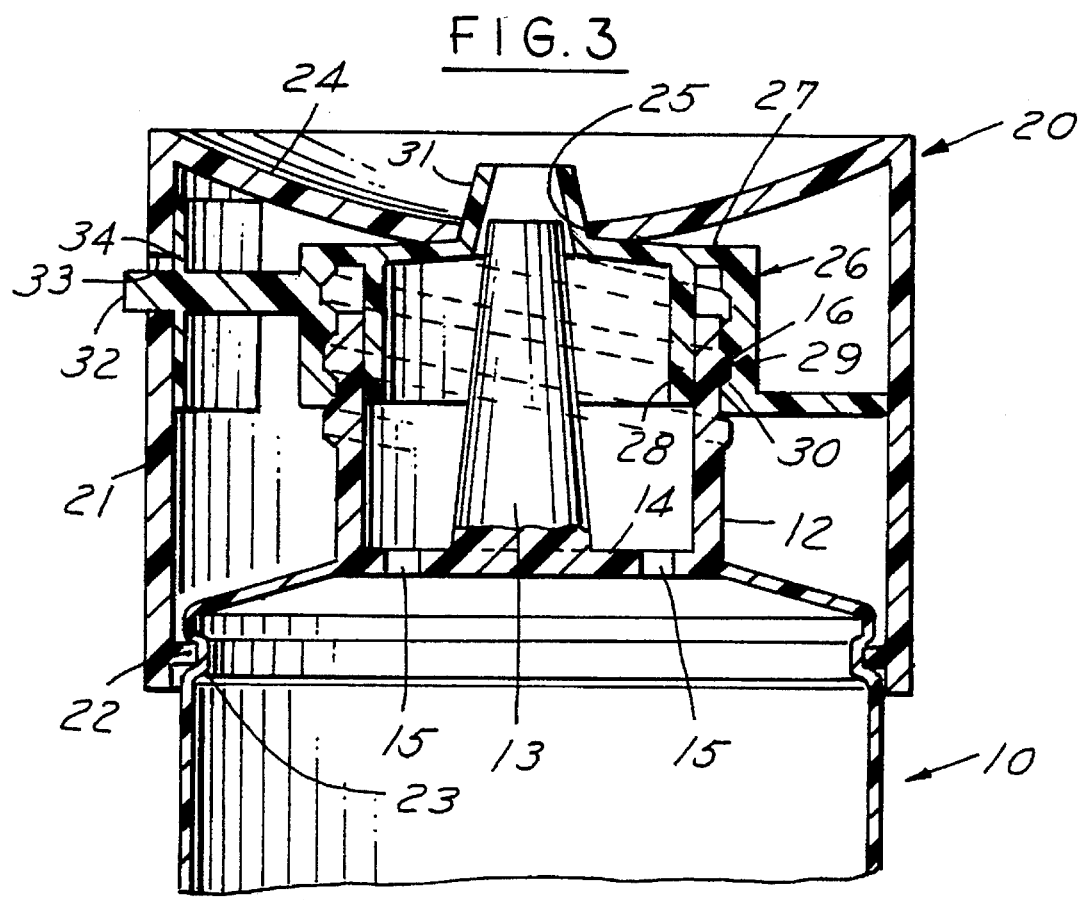

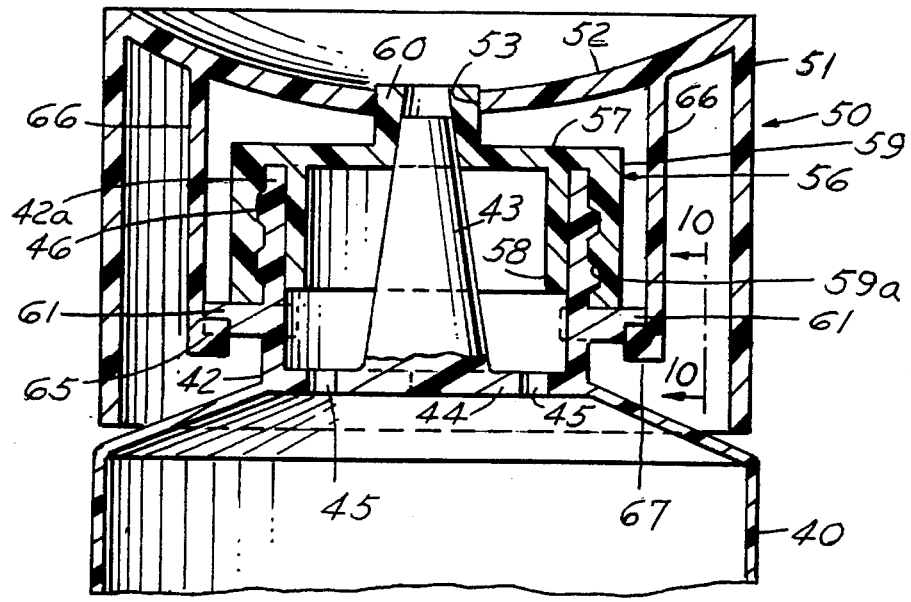
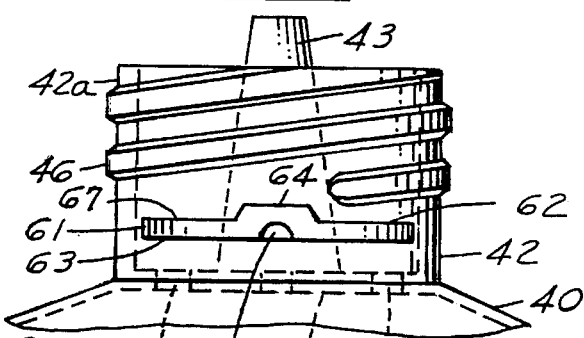
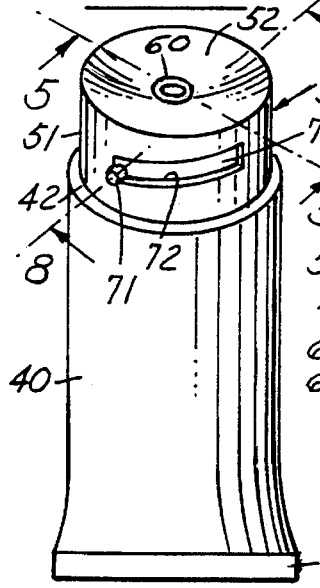
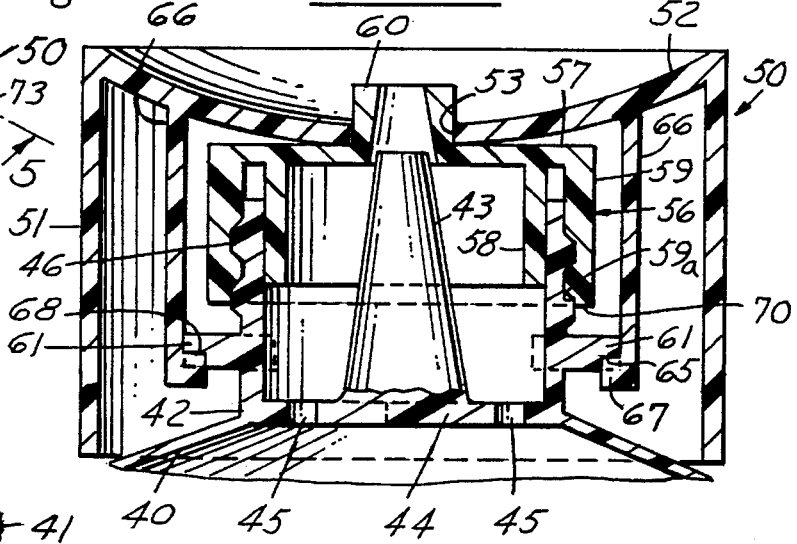

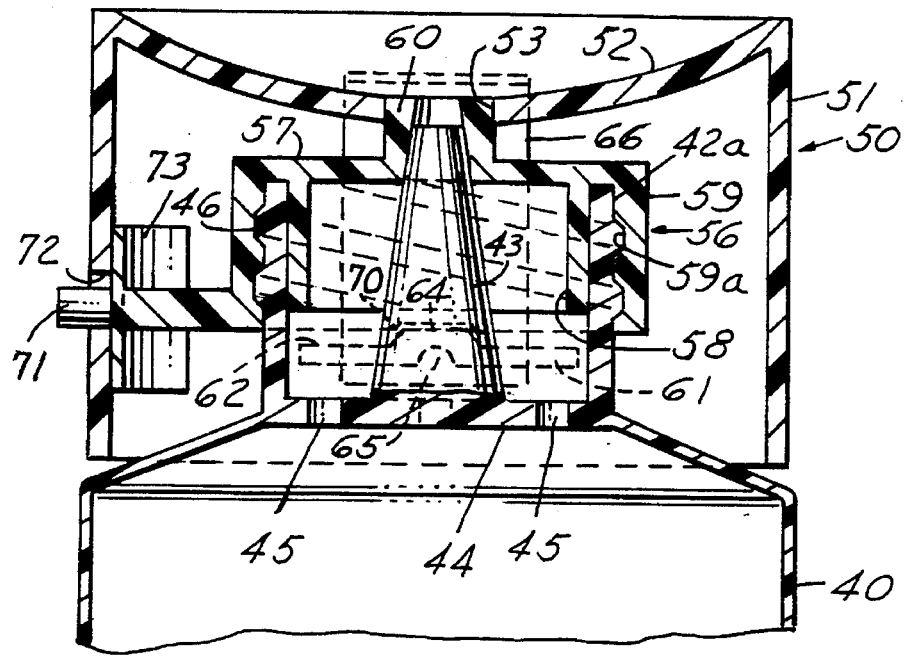
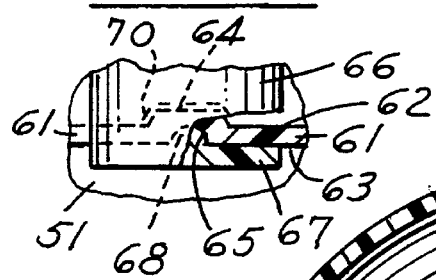
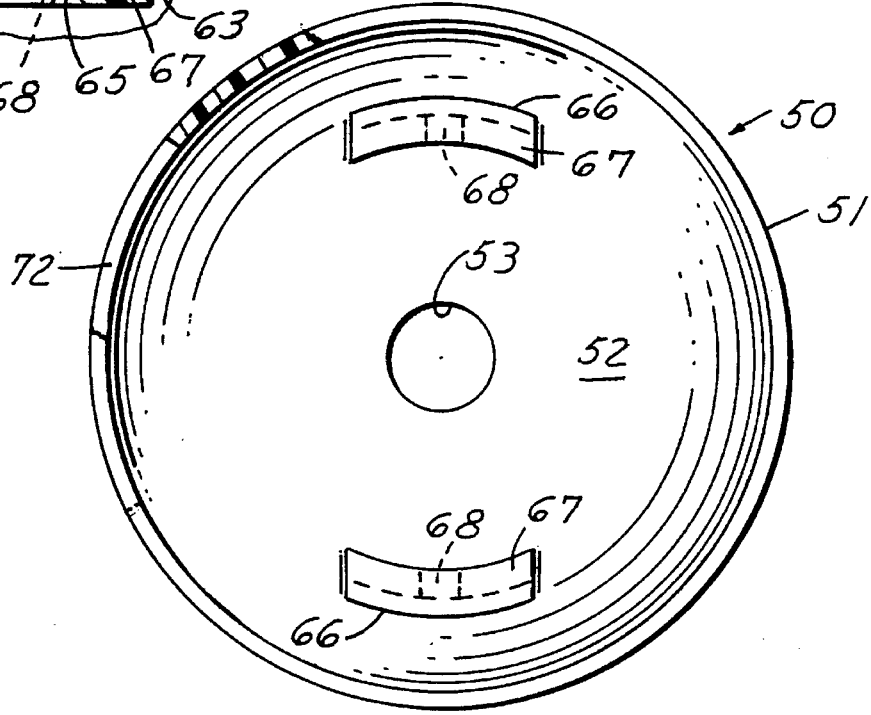

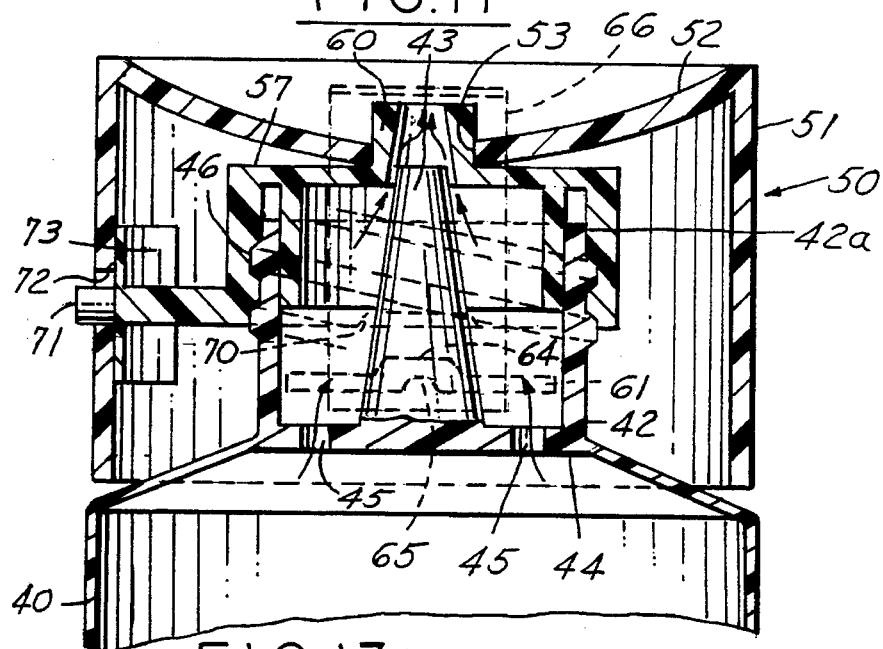
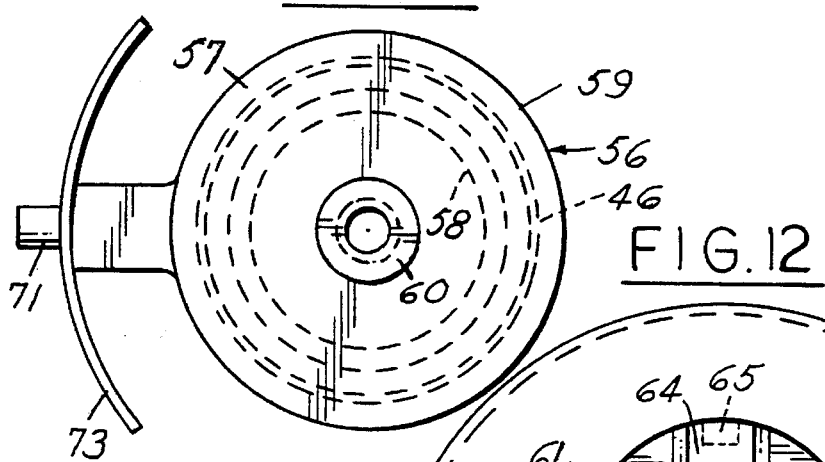
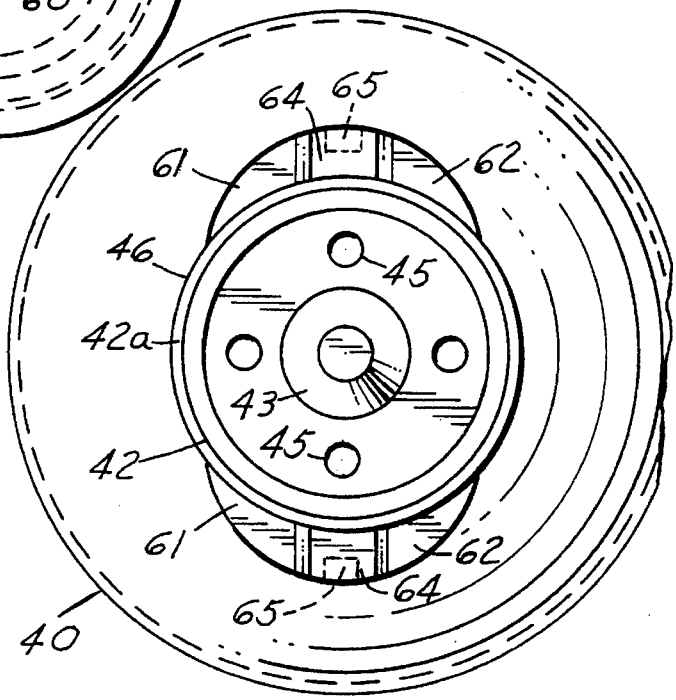

THUMB ACTUATED FLEXIBLE TUBE AND CLOSURE SYSTEM

This application is a continuation in part of U.S. application Ser. No. 08/228,048 filed Apr. 15, 1994.

This invention relates to a flexible tube and closure system and particularly to a thumb actuated flexible tube and closure system designed to be used in an inverted position to allow a product to be stored for immediate dispensing.

BACKGROUND AND SUMMARY OF THE INVENTION

In the aforementioned application, incorporated herein by reference, there is disclosed a method of forming a flexible plastic tube comprising injection molding a finish having an opening, extruding a tube integrally with the finish by relevant movement of the finish with respect to an extruder orifice, moving the finish axially away from the extruder orifice while continuing continuously extruding the tube, closing a blow mold about the extruded tube, blowing the tube into an integral container body having a closed bottom, opening the molds to provide an integral flexible tube with a finish thereon. Thereafter the method consists of decorating the body with indicia, and cutting the closed end of the tube leaving an open-ended tube of the end opposite the finish, and applying a closure to the finish. A closure is applied either before or after cutting the bottom from the container. Preferably the closure is applied to the finish after decorating. Subsequently, the tube is filled through the open end and the open end is sealed. The step of decorating includes rotating the tube about the longitudinal axis of the tube while engaging the finish and bottom. The step of decorating preferably comprises rotating the container relative to a silk screen printing device. The step of injection molding and extrusion molding preferably comprises injecting and extruding linear low density polyethylene. However, high density polyethylene and low density polyethylene may be used.

Among the objectives of the present invention are to provide a flexible tube and closure system which can be used in an inverted position; which can be manipulated by one hand; and which provides for directional dispensing.

In accordance with the invention, the plastic tube is provided with a finish and a thumb actuated closure is applied thereto. The closure has spaced walls defining an annular space for receiving the finish of the plastic tube and at least one of the walls has a thread thereon for rotatably engaging the finish. The closure includes a sealing portion that sealing engages a post on the finish so that rotation of the closure moves the sealing portion into and out of engagement with the post. A finger engaging portion on the closure is adapted to be engaged by a thumb as the plastic tube is held in an inverted position.

DESCRIPTION OF THE DRAWINGS

FIG. 3 is a view similar to FIG. 2 showing the parts in different operative position.

FIG. 4 is perspective view of a modified form of a flexible tube and closure system.

FIG. 5 is a fragmentary sectional view on an enlarged scale taken along the line 5—5 in FIG. 4.

FIG. 6 is a sectional view similar to FIG. 5 showing the closure in open position.

FIG. 7 is a side elevational view of the upper end of the tube shown in FIG. 5.

FIG. 8 is a sectional view taken along the line 8—8 in FIG. 4.

FIG. 9 is a bottom view of the overcap of the tube and closure system.

FIG. 10 is a fragmentary sectional view taken along the line 10—10 in FIG. 5.

FIG. 11 is a sectional view similar to FIG. 6 showing the closure in open position.

FIG. 12 is a top plan view of the upper end of the tube shown in FIG. 7.

FIG. 13 is a top plan view of the closure of the tube and closure system shown in FIGS. 5, 6 and 8.

DESCRIPTION OF THE PREFERRED EMBODIMENT

Figure 1:
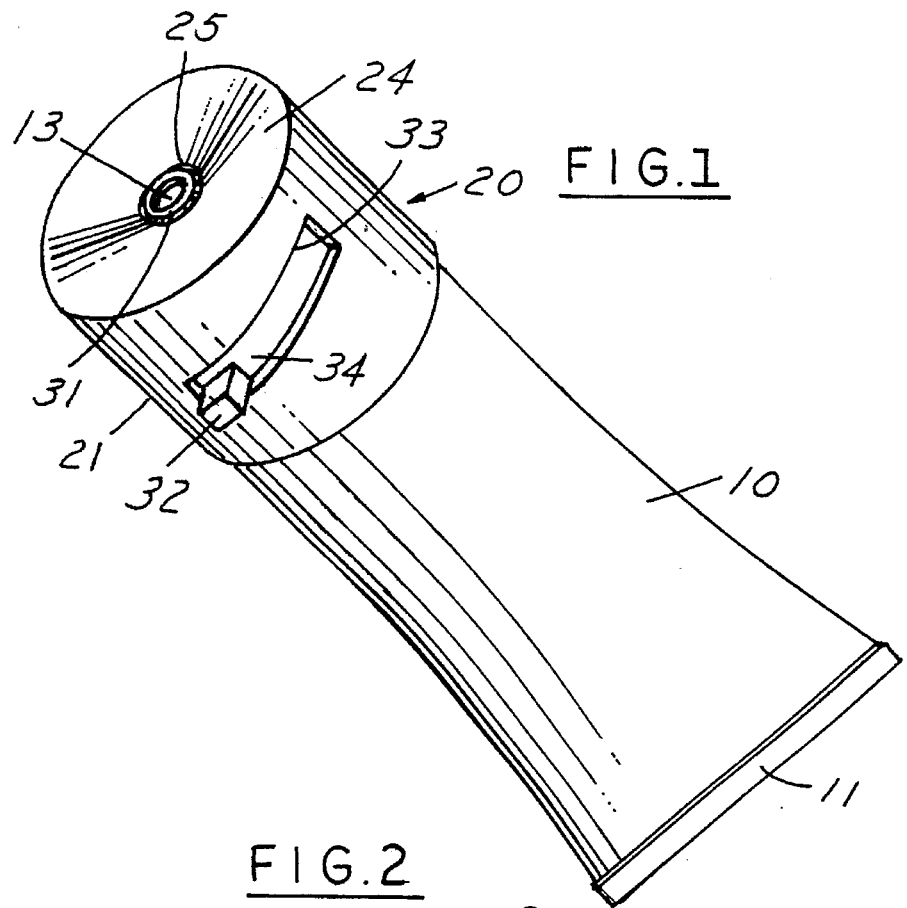
FIG. 1 is a perspective view of a flexible tube and closure system embodying the invention.
Figure 2:
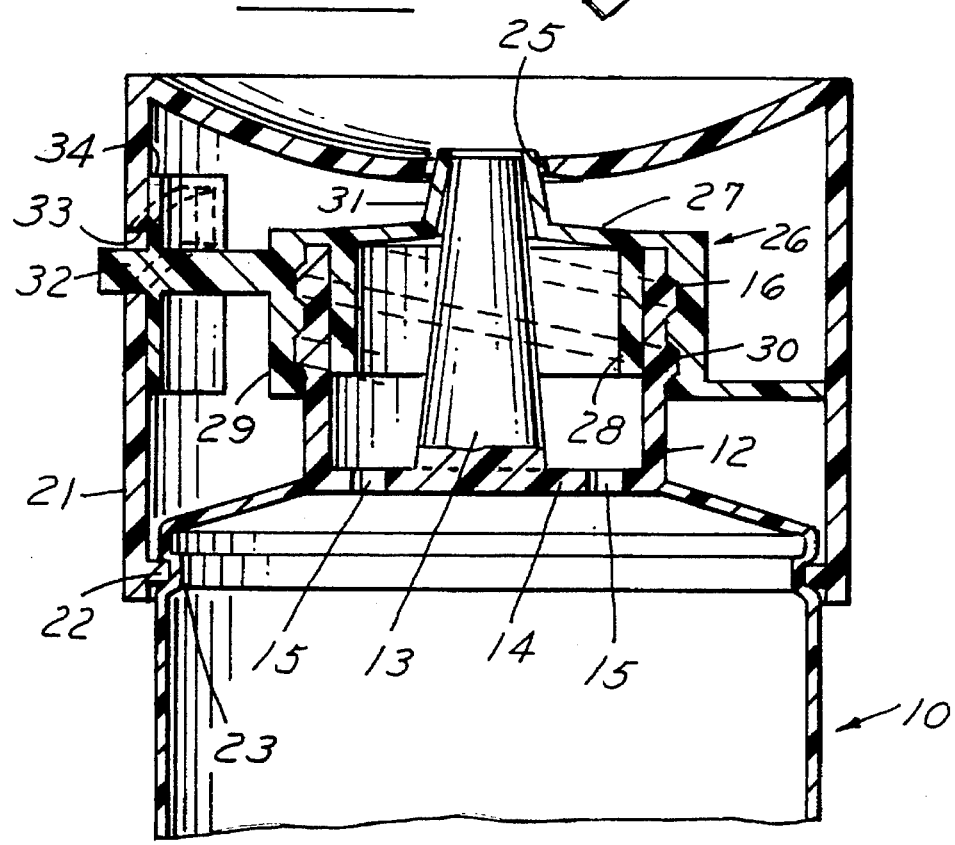
FIG. 2 is a fragmentary vertical sectional view of the system.

Referring to FIG. 1, the flexible tube and closure system embodying the invention comprises a flexible tube 10 having a closed end 11 at one end and an integral finish 12 (FIG. 2) at the other end. The finish further includes an integral frustoconical post 13 extending upwardly from a transverse wall 14 having its greatest diameter adjacent wall 14 and tapering upwardly to a free end. Openings 15 in transverse wall 14 provide for communication between the contents of the plastic tube and the interior of the finish. The finish includes a cylindrical wall 12a which has an external thread 16 therein. The free end of post 13 extends upwardly beyond the upper end of the wall 12.

An overcap closure 20 is provided on the package and includes a peripheral wall 21 that has a lower integral annular bead 22 on its inner surface that engages an integral groove 23 on the upper end of the body of the tube 10. The closure 20 further includes a base wall 24 that has its upper surface extending axially toward the finish and being concave inwardly. The base wall 24 includes a centrally located axial opening 25.

An inner closure 26 has an integral base wall 27, an inner cylindrical skirt 28 and outer cylindrical skirt 29. The outer skirt 29 is formed with a thread 30 in the form of a groove on its inner surface. The base wall 27 includes a frustoconical portion 31 that extends upwardly through an opening 25 of the overcap closure 20 with its upper end substantially flush with the base wall 24 (FIG. 2) but is movable by rotation of the inner closure 26 to an open dispensing position, (FIG. 3), as presently described.

The inner closure 26 includes an integral radial finger operating member 32 is provided integrally with the outer wall 29 and extends radially through an arcuate helical opening 33 in the peripheral wall 21 of the overcap closure 20 for engagement by finger of the user or by the thumb. An integral arcuate skirt 34 is provided integrally with the finger engaging member 32 and closes the opening 33 throughout movement between open and closed positions of the inner closure 26.

In use, the user inverts the tube 10 and manipulates the finger operating member 32, preferably by the thumb to open the closure system so that the contents can be dispensed by squeezing.

The flexible tube is preferably made by an injection, extrude and blow molding method as disclosed in the pending patent application Ser. No. 08/228,055, filed Apr. 15, 1994, having a common assignee with the present application, incorporated herein by reference. In accordance with the method of forming a flexible plastic tube comprising injection molding a finish having an opening, extruding a tube integrally with the finish by relevant movement of the finish with respect to an extruder orifice, moving the finish axially away from the extruder orifice while continuing continuously extruding the tube, closing a blow mold about the extruded tube, blowing the tube into an integral container body having a closed bottom, opening the molds to provide an integral flexible tube with a finish thereon. Thereafter the method consists of decorating the body with indicia, and cutting the closed end of the tube leaving an open-ended tube of the end opposite the finish, and applying a closure to the finish. A closure is applied either before or after cutting the bottom from the container. Preferably the closure is applied to the finish after decorating. Subsequently, the tube is filled through the open end and the open end is sealed. The step of decorating includes rotating the tube about the longitudinal axis of the tube while engaging the finish and bottom. The step of decorating preferably comprises rotating the container relative to a silk screen printing device. The step of injection molding and extrusion molding preferably comprises injecting and extruding linear low density polyethylene. However, high density polyethylene and low density polyethylene may be used.

The closure and overcap may be made of any plastic materials such as high density polyethylene or modified stryrene and preferably of polyproplene.

In the form of the invention shown in FIGS. 4–13, the flexible tube and closure system comprises a flexible tube 40 having a closed end 41 and an integral finish 42 at the other end. The finish 42 includes an integral frustoconical post 43 extending upwardly from a transverse wall and having its greatest diameter adjacent wall 44 and tapering upwardly to a free end. Openings 45 in transverse wall 44 provide communication with the contents of the plastic tube and the interior of the finish 42.

The finish 42 includes a cylindrical wall 42a extending upwardly and having an external thread 46. The free end of the post 43 extends upwardly beyond the upper end of the wall 42a. (FIG. 7)

An overcap closure 50 includes a peripheral wall 51 and a base wall 52 that has its upper surface extending axially toward the finish and being concave inwardly. Base wall 52 includes a centrally located axial opening 53.

An inner closure 56 has a base wall 57, an inner cylindrical wall 58 and an outer cylinder wall 59. The outer wall 59 includes an internal thread 59a in the form of a groove on its inner surface. Base wall 57 includes a frustoconical portion 60 that extends upwardly through opening 53 of overcap closure 50 with its upper end substantially flush (FIG. 5) but is movable by rotation of the inner closure 56 to an open dispensing position (FIG. 6) as presently described.

As shown in FIGS. 5–7 and 12 the finish 42 further includes diametrically opposed crescent shaped integral rigid tabs 61 that are flat in vertical cross section. Each tab 61 includes an upper surface 62 and lower surface 63. The upper surface 62 includes an upwardly extending radial projection 64 that has a trapezoidal cross section (FIG. 7). The lower surface 63 includes a radial recess or groove 65 that is semicircular in cross section.

As shown in FIGS. 5, 6 and 8 the overcap 50 includes diametrically opposed axial walls 66 that are arcuate in horizontal cross section with respect to the axis of the overcap. Each wall 66 has a limited circumferential width. Each wall 66 includes an integral flange 67 that extends radially inwardly and has a radial rib 68 on its upper surface that engages the radial groove 65 on a tab 61 to hold the overcap 56 in fixed position relative to the finish 42.

The outer peripheral wall 59 of the inner closure 56 includes diametrically opposed notches 70 on its lower free edge which are trapezoidal in cross section for engaging the trapezoidal radial projections 64 on the tabs 61 to hold the inner closure 56 in position such that the closure will not rotate relative to the finish unless force is supplied through an integral radial finger operating member 71 on inner closure 56. Radial member 71 extends through an arcuate helical opening 72 in the wall 51 of overcap 50 and includes an integral arcuate skirt 73 as is the form of the invention shown in FIGS. 11–13.

It can thus be seen that there has been provided a plastic tube provide a flexible tube and closure system which can be used in an inverted position; which can be manipulated by one hand; and which provides for directional dispensing.

What is claimed is:

1. A thumb actuated flexible tube and closure system comprising a flexible plastic tube having a finish for dispensing a product when the tube is in an inverted position comprising said finish having an integral transverse wall, an integral post extending upwardly from said transverse wall and an integral cylindrical wall extending upwardly from said transverse wall, said transverse wall having at least one opening therethrough, an inner closure having a base wall and integral spaced inner and outer walls defining an annular space for receiving the cylindrical wall of the finish of the plastic tube, at least one of said spaced inner and outer walls having thread means thereon for rotatably engaging cylindrical wall of the the finish, said base wall of said inner closure having a portion sealingly engaging said post on the finish such that rotation of the inner closure moves said sealing portion into and out of engagement with said post, an overcap closure having a base wall with an opening aligned with said sealing portion of said closure, said overcap and said finish having interengaging means to hold said overcap against rotational movement, said overcap including a peripheral wall having an opening therein, a finger engaging portion on said inner closure extending through said opening in said overcap closure adapted to be engaged by a thumb of the user as the plastic tube is held in inverted position to rotate said inner closure and move said inner closure into and out of sealing position with said post on said finish.

2. The flexible tube and closure system set forth in claim 1 wherein said interengaging means between said overcap closure and said finish comprises at least one integral radial tab on said finish, at least one wall on said overcap and interengaging rib and groove thereon.

3. The flexible tube and closure system set forth in claim 2 wherein said at least one tab includes two diametrically opposed integral radial tabs.

4. The flexible tube and closure system set forth in claim 3 wherein each said tab includes said radial groove, said overcap closure wall includes two integral opposed axial walls each said wall having an integral radially extending flange, each said flange having said radial rib engaging said radial groove on each of said tabs.

5. The flexible tube and closure system set forth in in claim 1 wherein said interengaging means between said overcap closure and said tube comprises interengaging means between the peripheral wall of said overcap closure and the body of said tube.

6. The flexible tube and closure system set forth in any one of claim 1–5 wherein said finger engaging portion includes an integral arcuate wall adjacent an inner surface of the peripheral wall of the overcap closure and covering the opening.

7. The flexible tube and closure systems set forth in claim 6 wherein said tube is made by injection molding the finish, extruding said integral tube, blow molding the integral tube to form a container and cutting a base of the container to provide an open end tube for filling.

8. The method of making a thumb actuated flexible tube and closure system comprising providing a flexible plastic tube having a finish for dispensing a product when the tube is in an inverted position by injection molding the finish, extruding the integral tube, blow molding the integral tube to form a container and cutting the base of the container to provide an open tube end for filling, forming the finish with a integral transverse wall, an integral post extending upwardly from the transverse wall and an integral cylindrical wall extending upwardly from the transverse wall, the transverse wall having at least one opening therethrough, providing an inner closure having a base wall and integral spaced inner and outer walls defining an annular space for receiving the cylindrical wall of the finish of the plastic tube, providing thread means on at least one of said spaced inner and outer walls for rotatably engaging the cylindrical wall of finish, providing the base wall of the inner closure with a portion sealingly engaging the post on the finish such that rotation of the inner closure moves said sealing portion into and out of engagement with the post, providing an overcap closure having a base wall with an opening aligned with the sealing portion of the closure, providing interengaging means in the overcap and finish to hold the overcap against the rotational movement, providing a pheripherl wall on the said overcap having an opening therein, providing a finger engaging portion on the inner closure extending through the opening in the overcap closure adapted to be engaged by a thumb of the user as the plastic tube is held in inverted position to rotate said inner closure and move the inner closure into and out of sealing position with the post on the finish.

9. The method of making a flexible tube and closure system set forth in claim 8 wherein said step of forming interengaging means between the overcap closure and the finish comprises forming at least one integral radial tab on the finish, forming at least one wall on the overcap and forming interengaging rib and groove thereon.

10. The method of making a flexible tube and closure system set forth in claim 9 including forming said at least one tab as two diametrically opposed integral radial tabs.

11. The method of making a flexible tube and closure system set forth in claim 10 including forming each tab with said radial groove, forming said overcap closure wall with two integral opposed axial walls each said wall having an integral radially extending flange, forming each said flange with said radial rib engaging said radial groove on each of said tabs.

12. The method of making a flexible tube and closure system set forth in in claim 8 wherein said step of forming interengaging means between said overcap closure and said tube comprises forming interengaging means between the peripheral wall of said overcap closure and the body of said tube.

13. The flexible tube and closure system set forth in any one of claim 8–12 wherein said step of forming the finger engaging portion includes forming the integral arcuate wall adjacent the inner surface of the peripheral wall of the overcap closure and covering the opening.

* * * * *